United States Patent [19]

Hartman

[11] 4,064,604
[45] Dec. 27, 1977

[54] SWIVELS

[76] Inventor: George F. Hartman, 1415 Larkwood Drive, Austin, Tex. 78723

[21] Appl. No.: 717,290

[22] Filed: Aug. 24, 1976

[51] Int. Cl.² .................. A44B 13/02; A01K 91/04
[52] U.S. Cl. .................................. 24/236; 24/237; 43/44.83; 43/43.13; 403/209
[58] Field of Search .............. 24/265 H, 236, 237, 24/241 S; 403/209, 213; 43/44.83, 43.13; 59/95

[56] References Cited
U.S. PATENT DOCUMENTS

| 2,531,235 | 11/1950 | Sicotte | 43/43.13 X |
| 3,200,459 | 8/1965 | Hartman | 24/236 X |
| 3,335,472 | 8/1967 | Imai | 24/237 |

Primary Examiner—Philip C. Kannan
Attorney, Agent, or Firm—John C. Stahl

[57] ABSTRACT

An improved snap swivel comprising a lightweight, plate-like body of thermoplastic composition including a recess in the rearmost portion of one side, an eye rotatably mounted in the foremost end of said body, and a clasp freely pivoted in proximity to the rearmost end of said body, said clasp including an angularly inwardly extending leg adapted to lie in said recess and a hook adapted to engage and disengage said leg when said clasp is rotated at right angles to said body.

11 Claims, 8 Drawing Figures

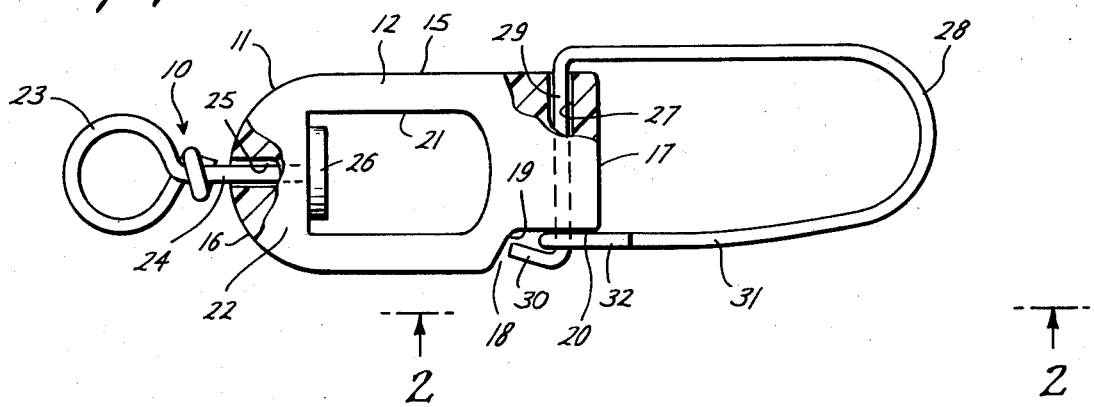
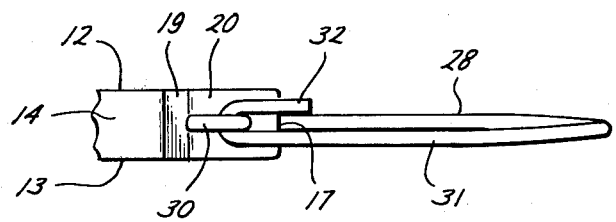
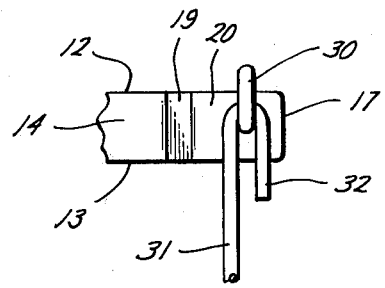
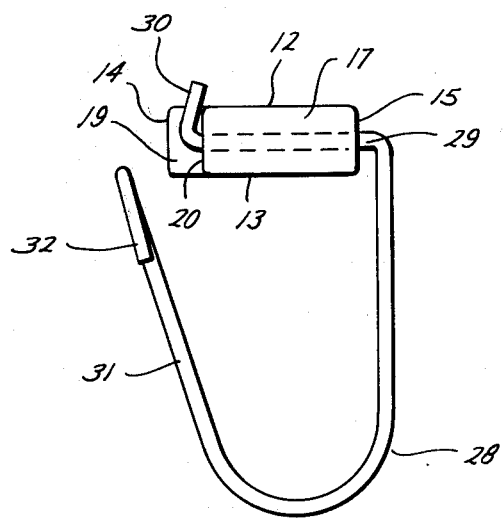

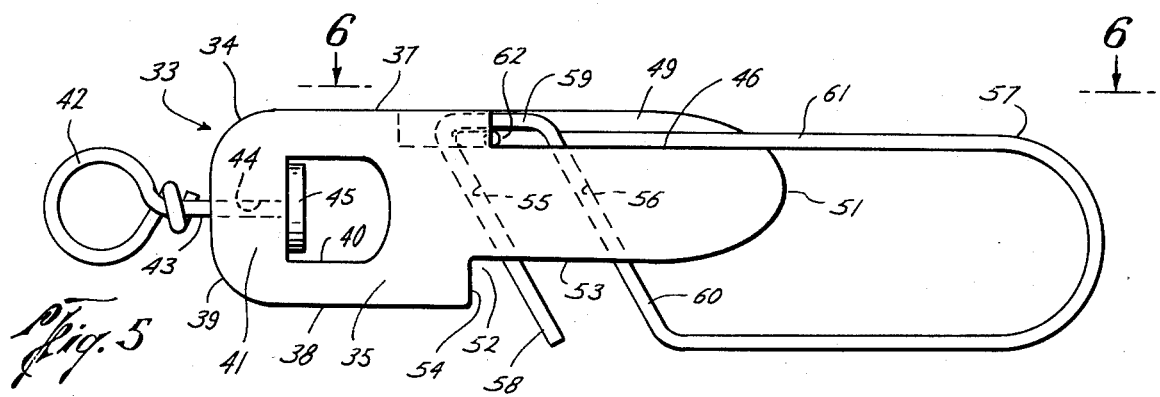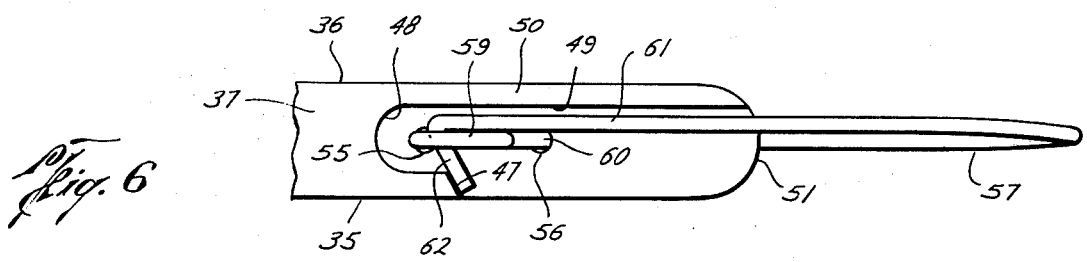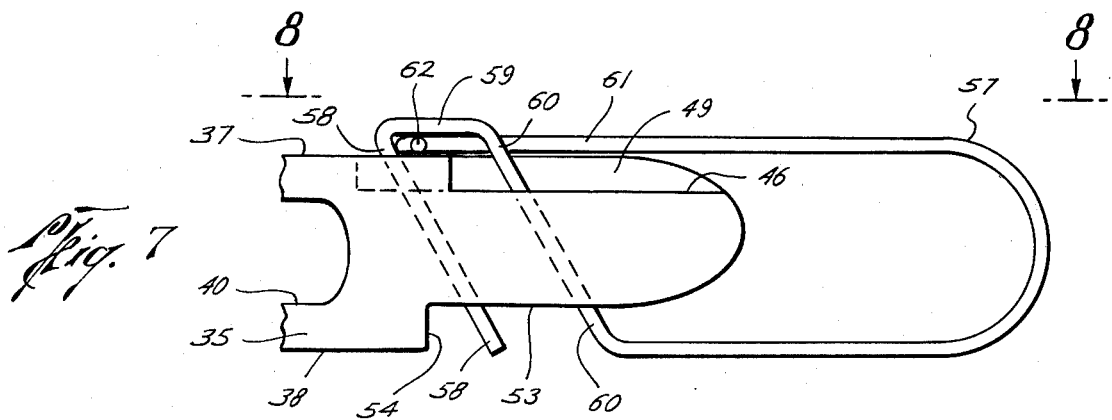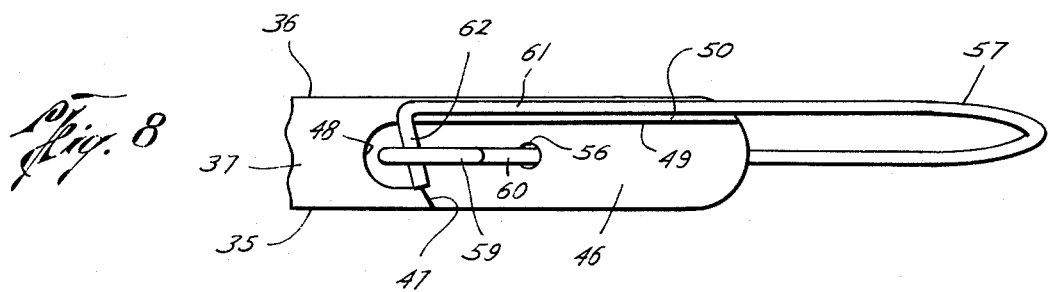

SWIVELS

BACKGROUND OF THE INVENTION

As is well known, snap swivels of metallic composition normally include a ball and socket type joint on at least one end thereof; such type joint tends to corrode causing the bearing members to bind with resultant line twisting and/or abnormal movement by a lure secured thereto. Furthermore, the weight of these swivels drag down the head of a light spinner or lure, and are readily detectable in the water.

SUMMARY OF THE INVENTION

The primary object of the invention is the provision of a lightweight, accurately formed and smoothly surfaced snap swivel of thermoplastic composition which is inconspicuous in water, produces a planing effect during movement in the water, and minimizes twisting of the fishing line.

Another object is to provide a snap swivel which provides a slight off-center pull which in combination with the flat body shape gives a positive resistance to line twisting, thus producing true lure action, even at low speeds.

Still another object is to provide such a snap swivel wherein the clasp is formed of small diameter wire yet the connection between the hook and the coacting leg is very strong and resists accidental opening.

Other objects and features of the invention will become apparent to those skilled in the art from a consideration of the following specification when read in the light of the annexed drawings.

BRIEF DESCRIPTION OF THE DRAWINGS

FIG. 1 is a greatly enlarged side elevational view, partly in section, of the preferred embodiment of snap swivel of the subject invention.

FIG. 2 is a fragmentary side elevational view, taken on the line 2—2 of FIG. 1, looking in the direction of the arrows.

FIG. 3 is a fragmentary side elevational view, similar to the view of FIG. 2, showing the clasp rotated in a clockwise direction and extending vertically downward.

FIG. 4 is a rear elevational view showing the hook disengaged from the coacting leg on the opposing end of the clasp.

FIG. 5 is a greatly enlarged side elevational view of another embodiment of snap swivel of the invention, showing the clasp in secured condition.

FIG. 6 is a fragmentary top plan view, taken on the line 6—6 of FIG. 5, looking in the direction of the arrows.

FIG. 7 is a fragmentary side elevational view of the rearmost portion of FIG. 5, showing the clasp in elevated condition preparatory to disengaging the leg of the resilient arm from the coacting loop of said clasp.

FIG. 8 is a fragmentary top plan view, taken on the line 8—8 of FIG. 7, looking in the direction of the arrows.

DESCRIPTION OF PREFERRED EMBODIMENTS

Referring now to the drawings, wherein like reference numerals designate like or corresponding parts throughout the several views, there is shown in FIGS. 1–4 a preferred embodiment of snap swivel 10 of the subject invention. Body 11 is of tough, transparent or translucent thermoplastic, preferably formed by molding to produce a plate-like structure which is accurately shaped and smooth surfaced. In the practice of the invention a translucent, thermoplastic organic synthetic resin such as nylon has ideal low friction bearing characteristics in direct contact with metal, and a transparent thermoplastic such as Lexan is used to produce a body which is almost invisible in the water. The molded body 11 is oblong and has uniform thickness materially less than its length or width with opposing broad flat faces 12–13 terminating laterally in opposing flat edges 14–15; the foremost end 16 of said body is preferably arcuate while the rearmost, transversely extending end 17 is essentially vertical. Edge 14, substantially shorter than edge 15, terminates rearwardly in recess 18 comprising an inwardly and vertically extending shoulder 19, and longitudinally and vertically extending shoulder 20 which terminates rearwardly in end 17.

An elongated slot 21 through the foremost portion of said body forms a transversely extending section 22. Eye 23 for the attachment of a fishing line is of non-corrosive wire or the like and includes shank 24 which passes through medially and longitudinally extending bore 25 in section 22 in a relatively loose fit for free rotational movement; as indicated by reference numeral 26, said shank is expanded rearwardly of section 22.

A transversely extending bore 27 through the rearmost portion of said body surfaces in the approximate center of shoulder 20 and the corresponding portion of edge 15. Clasp 28 of non-corrosive wire or the like for the attachment of tackle is freely pivoted to body 11. Specifically, transversely extending bar 29 of said clasp passes through bore 27 in a relatively loose fit; leg 30 is turned angularly inward at an acute angle with respect to bar 29 at a point at least slightly outwardly of shoulder 20, said leg lies in the major plane of said clasp and terminates forwardly in close proximity to shoulder 19. Resilient arm 31 of said clasp terminates outwardly in hook 32. When clasp 28 is rotated in a clockwise direction approximately ninety degrees with said leg extending vertically upward, as shown in FIG. 3, the upper end of said leg is at least slightly above the plane of face 12 and in such position is spaced outwardly of shoulder 20 a sufficient distance to permit hook 32 to pass over and engage said leg. This is easily accomplished by compressing the resilient arm of said clasp and passing the hook upwardly and inwardly at which time hook 32 normally inserts into the interior angle formed between said leg and transverse bar 29. To open said clasp, leg 30 must be rotated to extend vertically upward; at such time an upward force applied to the bail of said clasp forces hook 32 upwardly and clears leg 30; upon releasing such force the resilient arm normally extends outwardly of edge 14 as shown in FIG. 4 of the drawings.

Body 11 heretofore described is desirably fabricated from two shaped and coacting members such as would be formed by separating said body along its medial, major plane. Eye 23 and clasp 28, constructed in accordance with the principles heretofore described, are positioned on one such member after which the opposing member is placed thereon; the coacting members are then secured by plastic welding or the like to form a unitary structure.

The flat, planar surfaces of faces 12, 13 prevent rotation of the body in the water while the free pivotal action of eye 23 prevents twisting of the line attached thereto. It is to be noted that the center of the bail of said clasp is slightly off-center with respect to the medial, longitudinal axis of the body; this provides a slight off-set pull on the tackle which in combination with the non-rotating body provides true lure action, even at low speeds. Increased tension on the tackle attached to clasp 28 tends to tighten and secure hook 32 to leg 30 on the opposite end of said clasp.

There is shown in FIGS. 5-8 snap swivel 33 having means to attach the fishing line to one end thereof and means to facilitate the quick attachment and detachment of a lure or other bait at its opposite end. Body 34 of said swivel is of transparent or translucent thermoplastic composition and uniform thickness materially less than its length or width; said body includes broad flat parallel faces 35-36 and laterally extending top 37 with bottom 38 parallel thereto. The foremost end 39 of said body is generally convex; a relatively large opening 40 through the body portion in proximity to the foremost end forms a transverse section 41 for the mounting of a line attaching eye 42. Specifically, eye 42 includes shank 43 which is passed through medially and longitudinally extending bore 44 in section 41 in a relatively loose fit and expanded rearwardly thereof, as indicated by reference numeral 45.

Recess 46 in top 37, of desired shape and uniform depth, terminates laterally in the rear half of side 35 and is bounded by a relatively short, vertically and angularly forwardly extending shoulder 47 in the approximate center of the body, arcuate and vertically extending shoulder 48 forwardly thereof, and longitudinally and vertically extending shoulder 49 of flange 50; said flange is of uniform width, parallels face 36, and extends rearwardly into end 51 of the body which is generally convex. Recess 52 in the lower, rearmost portion of the body includes flat 53 which parallels bottom 38 and is spaced at least slightly thereabove; said flat terminates forwardly in transversely and vertically extending shoulder 54 in the approximate center of the body and rearwardly in end 51. Angularly and rearwardly extending bore 55 in the medial, longitudinal plane of said body surfaces in recess 40 at least slightly forwardly of shoulder 47 and downwardly in flat 53 at least slightly rearwardly of shoulder 54. Angularly and rearwardly extending bore 56, approximately paralleling bore 55, surfaces in recess 46 rearwardly of shoulder 47 and downwardly in flat 53.

Clasp 57 of non-corrosive wire or the like comprises section 58 adapted to ride in bore 55, upstanding loop 59, section 60 adapted to ride in bore 56, and resilient arm 61 which terminates forwardly in transversely and rearwardly extending leg 62 bent at an acute interior angle with respect thereto and adapted to pass beneath loop 59. When the resilient arm 61 is positioned inwardly of shoulder 49 and leg 62 passed beneath loop 59, to achieve the secured condition illustrated in FIG. 6, a rearward force exerted on the bail of the clasp causes the loop to bear against the upper surface of said leg forcing the same downwardly and rearwardly into engagement with shoulder 47. Sections 58, 60 of said clasp frictionally engage the respective bores in which they ride thereby securing loop 59 in such position over leg 62 and prevents accidental opening of the clasp. Furthermore, although wire of very small diameter is used for the clasp, the locking mechanism thus formed is very secure and resists any tendency to distort which may result in opening said clasp.

When clasp 57 is pushed angularly forward, as shown in FIGS. 7 and 8, sections 58, 60 ride upwardly in their respective bores until loop 59 is at least slightly above the plane of top 37; at such time leg 62 may be rotated in a clockwise direction, clearing loop 59, and the clasp is opened.

In a modification of the embodiment of FIGS. 5-8, the height of faces 35, 36 is substantially greater than the width of the body thereby producing a plate-like structure which provides a planing effect in water. Furthermore, the lower end of section 58 may be turned angularly rearwardly to lie in the plane of flat 53 and is adapted to butt the same to provide a stop for the upper limit of travel of said clasp.

It should be understood, of course, that the foregoing disclosure relates to only preferred embodiments of the invention and that it is intended to cover all changes and modifications of the invention herein chosen for the purposes of the disclosure which do not constitute departures from the spirit and scope of the invention.

What is claimed is:

1. A snap swivel comprising
a body of thermoplastic composition including opposing broad flat faces terminating laterally in flat edges,
an opening in one end of said body,
an attaching eye having a shank portion rotatably mounted within said opening,
said shank having a head on the end thereof remote from the eye presenting a bearing surface for engagement with the body adjacent said opening,
a transversely extending bore in proximity to the rear end of said body,
a recess in the rearmost portion of one of said edges,
a clasp freely pivoted to said body,
said clasp including a transversely extending section carried in said bore and terminating outwardly in a inwardly inclined leg adapted to at least partially lie in said recess, and a resilient arm including a hook adapted to engage said leg when said clasp is turned perpendicularly upward with respect to the longitudinal axis of said body.

2. The invention of claim 1 wherein said hook of said resilient arm is adapted to insert into the interior angle formed between said transversely extending section and said inwardly inclined leg.

3. The invention of claim 1 wherein said body is transparent.

4. The invention of claim 1 wherein said body is translucent.

5. The invention of claim 4 wherein said body is composed of an organic synthetic resin.

6. A snap swivel comprising
a body of thermoplastic composition including a top, bottom, opposing flat faces, and opposing ends,
an opening in one end of said body,
an attaching eye having a shank portion freely rotatably mounted within said opening,
said shank having a head on the end thereof remote from the eye presenting a bearing surface for engagement with the body adjacent said opening,
a recess in the rearmost portion of said top,
an angularly forwardly extending shoulder at least partially bounding said recess,
first and second spaced and angularly rearwardly extending bores lying in the approximate medial, longitudinal plane of said body and opening upwardly in the recess in said top,
a shaped clasp mounted in said body, said clasp including a first section adapted to ride in said first bore, an upstanding loop, a second section adapted to ride in said second bore, a resilient arm, and an angularly outwardly extending leg adapted to pass under said loop and bear against said shoulder of said body.

7. The invention of claim 6 wherein said first and second sections of said clasp ride downwardly and rearwardly in their respective bores and force the leg of said clasp into engagement with said angularly inclined shoulder of said body.

8. The invention of claim 6 further including a recess in the rearmost portion of said bottom, said first and second sections of said clasp surfacing in said recess in said bottom.

9. The invention of claim 6 wherein said body is transparent.

10. The invention of claim 6 wherein said body is translucent.

11. The invention of claim 10 wherein said body is composed of an organic synthetic resin.

* * * * *